United States Patent
Imamura et al.

(10) Patent No.: US 11,816,444 B2
(45) Date of Patent: Nov. 14, 2023

(54) PSEUDO PARALLEL TRANSLATION DATA GENERATION APPARATUS, MACHINE TRANSLATION PROCESSING APPARATUS, AND PSEUDO PARALLEL TRANSLATION DATA GENERATION METHOD

(71) Applicant: NATIONAL INSTITUTE OF INFORMATION AND COMMUNICATIONS TECHNOLOGY, Koganei (JP)

(72) Inventors: Kenji Imamura, Koganei (JP); Atsushi Fujita, Koganei (JP); Eiichiro Sumita, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 584 days.

(21) Appl. No.: 16/969,619

(22) PCT Filed: Feb. 12, 2019

(86) PCT No.: PCT/JP2019/004805
§ 371 (c)(1),
(2) Date: Aug. 13, 2020

(87) PCT Pub. No.: WO2019/167600
PCT Pub. Date: Sep. 6, 2019

(65) Prior Publication Data
US 2021/0027026 A1    Jan. 28, 2021

(30) Foreign Application Priority Data
Mar. 2, 2018 (JP) ................ 2018-037055

(51) Int. Cl.
*G06F 40/58* (2020.01)
*G06N 3/08* (2023.01)
(Continued)

(52) U.S. Cl.
CPC ............ *G06F 40/58* (2020.01); *G06F 18/211* (2023.01); *G06N 3/084* (2013.01)

(58) Field of Classification Search
CPC .......... G06F 40/58; G06F 40/44; G06F 40/45; G06F 40/47; G06F 40/211; G06F 40/253;
(Continued)

(56) References Cited

U.S. PATENT DOCUMENTS 9,152,622 B2 * 10/2015 Marcu ..................... G06F 40/45
2005/0038643 A1 * 2/2005 Koehn .................... G06F 40/44
704/2

(Continued)

OTHER PUBLICATIONS

Gulcehre et al., title={On integrating a language model into neural machine translation}, 2017, journal={Computer Speech \& Language}, vol.={45}, pp.={137-148}, publisher={Elsevier} (Year: 2017).*

(Continued)

*Primary Examiner* — Lamont M Spooner
(74) *Attorney, Agent, or Firm* — Keating & Bennett, LLP

(57) ABSTRACT

Provided are a model training method for neural machine translation that enhances an encoder using a monolingual corpus of a target language and improves the accuracy of the entire translator, and a machine translation system for performing the model training method. The machine translation system 1000 uses a monolingual corpus of the target language to obtain multiple pieces of pseudo source language data, thus allowing for obtaining a large amount of pseudo parallel corpus data having diversity. Further, the machine translation system 1000 uses both the pseudo parallel corpus data having diversity, which has been obtained in large (Continued)

quantities, and the base parallel corpus data in a small quantity but with high accuracy, with the applied learning rates changed accordingly, to perform the learning process (training process) for the machine translation model. This allows the machine translation system 1000 to obtain a learned model (machine translation model) with very high accuracy.

7 Claims, 14 Drawing Sheets

(51) Int. Cl.
  *G06N 3/084* (2023.01)
  *G06F 18/211* (2023.01)
(58) Field of Classification Search
  CPC ...... G06F 40/268; G06F 40/284; G06F 40/30; G06N 3/08
  See application file for complete search history.

(56) References Cited

U.S. PATENT DOCUMENTS

| | | | | |
|---|---|---|---|---|
| 2008/0133444 A1* | 6/2008 | Gao | ............ | G06F 40/49 |
| | | | | 707/999.005 |
| 2008/0262828 A1* | 10/2008 | Och | ............ | G06F 40/47 |
| | | | | 704/3 |
| 2012/0101804 A1* | 4/2012 | Roth | ............ | G06F 40/45 |
| | | | | 704/2 |
| 2014/0350913 A1* | 11/2014 | Cheng | ............ | G06F 40/20 |
| | | | | 704/2 |
| 2016/0179790 A1* | 6/2016 | Watanabe | ............ | G06F 40/47 |
| | | | | 704/7 |
| 2016/0350290 A1* | 12/2016 | Fujiwara | ............ | G06F 40/51 |
| 2017/0031901 A1* | 2/2017 | Song | ............ | G06F 40/44 |
| 2017/0060855 A1* | 3/2017 | Song | ............ | G06F 40/55 |
| 2017/0293611 A1* | 10/2017 | Tu | ............ | G06F 16/48 |
| 2017/0371868 A1* | 12/2017 | Zhang | ............ | G06F 40/44 |
| 2018/0203852 A1* | 7/2018 | Goyal | ............ | G06F 40/56 |
| 2018/0300317 A1* | 10/2018 | Bradbury | ............ | G06F 40/44 |
| 2018/0341646 A1* | 11/2018 | Fujiwara | ............ | G06F 40/51 |
| 2018/0357224 A1* | 12/2018 | Yamauchi | ............ | G06F 40/51 |
| 2019/0018842 A1* | 1/2019 | Nomura | ............ | G06F 40/58 |
| 2019/0087417 A1* | 3/2019 | Wang | ............ | G06F 40/53 |
| 2019/0155909 A1* | 5/2019 | Na | ............ | G06F 40/58 |
| 2019/0213261 A1* | 7/2019 | Mochida | ............ | G06F 40/58 |
| 2020/0097554 A1* | 3/2020 | Rezagholizadeh | ............ | G06N 3/084 |
| 2020/0302124 A1* | 9/2020 | Cai | ............ | G06F 40/295 |

OTHER PUBLICATIONS

Imankulova et al., title={Improving low-resource neural machine translation with filtered pseudo-parallel corpus}, booktitle={Proceedings of the 4th Workshop on Asian Translation (WAT2017)}, pp.={70-78}, year={2017} (Year: 2017).*

Tan et al., title={XMU neural machine translation systems for WMT 17}, booktitle={Proceedings of the Second Conference on Machine Translation}, pp.={400-404}, 2017 (Year: 2017).*

Zhang et al., title={Improving neural machine translation through phrase-based forced decoding}, journal={arXiv preprint arXiv: 1711.00309}, year={2017} (Year: 2017).*

Official Communication issued in International Patent Application No. PCT/JP2019/004805, dated May 7, 2019.

Sennrich et al. "Improving Neural Machine Translation Models with Monolingual Data", Proceedings of the 54th Annual Meeting of the Association for Computational Linguistics, Aug. 7-12, 2016, pp. 86-96.

Fujita et al., "Japanese to English/Chinese/Korean Datasets for Translation Quality Estimation and Automatic Post-Editing", Proceedings of the 4th Workshop on Asian Translation, Nov. 27, 2017, pp. 79-88.

Imankulova et al., "Creation of high-quality large-scale pseudo-parallel bilingual corpus by reverse translation", The Association for Natural Language Processing, Mar. 2017, 7 pages.

Imamura et al., "Introduction of monolingual corpus into neural machine translation by pseudo-text generation", The Association for Natural Language Processing, Mar. 2017, 7 pages.

\* cited by examiner

| Target language D1_j | 日本で怪我や病気をしたときはどうすればいいのでしょうか？ |
|---|---|

Pseudo source language group data: D1_e_N = { D1_e[1], D1_e[2], D1_e[3], D1_e[4], D1_e[5] }  N = 5

| Log likelihood | | Pseudo source sentence (Pseudo source language data D1_e) |
|---|---|---|
| -2.25 | D1_e[1] | What should I do when I get injured or sick in Japan ? |
| -2.38 | D1_e[2] | What should I do if I get injured or sick in Japan ? |
| -5.20 | D1_e[3] | What should I do if I get injured or ill-ness in Japan ? |
| -5.22 | D1_e[4] | What should we do when we get injured or sick in Japan ? |
| -13.87 | D1_e[5] | If I get injured or a sickness in japan ,what shall I do ? |

| Manual back-translation | What should I do when I get injured or sick in Japan ? |
|---|---|

FIG. 12

PSEUDO PARALLEL TRANSLATION DATA GENERATION APPARATUS, MACHINE TRANSLATION PROCESSING APPARATUS, AND PSEUDO PARALLEL TRANSLATION DATA GENERATION METHOD

TECHNICAL FIELD

The present invention relates to a neural machine translation technique using encoder/decoder architecture.

BACKGROUND ART

In recent years, neural machine translation (NMT) using encoder/decoder architecture has become a mainstream machine translation. In the neural machine translation using encoder/decoder architecture, an encoder encodes an input sentence (original sentence) into numerical vectors called states by an encoder, and then a decoder generates a translation sentence based on the states. The neural machine translation using encoder/decoder architecture is capable of generating high-quality translations compared to conventional statistical machine translation; on the other hand, a large amount of parallel text datasets are required to train a model for the neural machine translation using encoder/decoder architecture. However, large-scale parallel corpora are generally difficult to obtain compared to monolingual corpora.

To solve this problem, technique disclosed in Non-Patent Document 1 employs a method that generates pseudo parallel translation sentences by back-translating a target language monolingual corpus into a source language and then mixes the generated pseudo parallel translation sentences with a parallel corpus to train. The advantage of this method is that although it is pseudo parallel translation sentences that are generated by this method, the decoder is correctly trained because sentences on the target language side are correct sentences created by a person. Thus, using the above method allows for constructing a model for machine translation with stability and with high accuracy as compared with a method of constructing a language model from a monolingual corpus.

PRIOR ART DOCUMENTS

Non-Patent Document 1: Rico Sennrich, Barry Haddow, and Alexandra Birch. 2016a. Improving neural machine translation models with monolingual data. In Proc. of ACL-2016 (Volume 1: Long Papers), pages 86-96.

DISCLOSURE OF INVENTION

Technical Problem

However, in the method disclosed in Non-Patent Document 1, training is performed using pseudo-original texts including errors, and thus there is a possibility that the accuracy of the encoder has not been enhanced.

In view of the above problems, it is an object of the present invention to provide a model training method for neural machine translation that enhances the accuracy of the entire translator by enhancing the performance of an encoder (including an attention mechanism) using a monolingual corpus of a target language and provide a machine translation system for performing the model training method. Another object of the present invention is to provide a pseudo parallel translation data generation apparatus and a machine translation processing apparatus for the above-described machine translation system, and a pseudo parallel translation data generation method performed in the machine translation system.

Solution to Problem

To solve the above problems, a first aspect of the invention provides a pseudo parallel translation data generation apparatus including a back-translation unit and a pseudo parallel translation data obtaining unit.

The back-translation unit performs a machine back-translation process on one piece of target language data obtained from a target language monolingual corpus to obtain N pieces of pseudo source language data. N is a natural number equal to or greater than two.

The pseudo parallel translation data obtaining unit pairs the one piece of target language data and each of the N pieces of pseudo source language data obtained by the back-translation unit to obtain N sets of pseudo parallel translation data.

This allows the pseudo parallel translation data generation apparatus to obtain multiple pieces of pseudo source language data using a monolingual corpus of the target language, thus obtaining a large amount of pseudo parallel corpus data having diversity.

A second aspect of the present invention provides the pseudo parallel translation data generation apparatus of the first aspect of the present invention in which the back-translation unit includes an encoder and a decoder.

The encoder obtains input-side hidden state data from input data.

The decoder obtains output-side hidden state data from the input-side hidden state data obtained by the encoder, randomly selects data from an output word distribution represented by the obtained output-side hidden state data, and outputs word data corresponding to the selected data as output data.

This causes the pseudo parallel translation data generation apparatus to output, from the decoder, not only data having the maximum posterior probability of the output word but also data having a low posterior probability (low likelihood) of the output word. This allows the pseudo parallel translation data generation apparatus to obtain pseudo parallel translation data having diversity that has been difficult to obtain in the past.

Note that "input-side hidden state data" is data indicating an internal state obtained when input data is encoded by an encoder. For example, the "input-side hidden state data" is data (data representing an internal state) obtained when the LSTM layer performs a process on the embedding data that is obtained by performing an embedding process on the input data.

A third aspect of the present invention provides the pseudo parallel translation data apparatus of the first or second aspect of the present invention further includes a pseudo parallel corpus storage unit that stores the pseudo parallel translation data.

The pseudo parallel translation data obtaining unit performs a filtering process on the N sets of pseudo parallel translation data based on at least one of the likelihood and confidence of the pseudo source language data obtained by the back-translation unit, and stores the pseudo parallel translation data after the filtering process in the pseudo parallel corpus storage unit.

This allows for obtaining, based on likelihood and confidence, pseudo parallel translation data that allows a learning process to be efficiently performed when model learning for machine translation is performed.

Fourth aspect of the invention provides a machine translation processing apparatus including a composite parallel translation data obtaining unit and a translation unit.

The composite parallel translation data obtaining unit corresponds base parallel translation data obtained from a base parallel corpus to a first learning rate corresponding to the base parallel translation data to generate first batch set data, and corresponds pseudo parallel translation data generated by the pseudo parallel translation data generation apparatus according to one of the first to third aspects of the invention to a second learning rate corresponding to the pseudo parallel translation data to generate second batch set data. The composite parallel translation data obtaining unit obtains composite parallel translation data including the first batch set data and the second batch set data.

The translation unit obtains a learned model for a machine translation process by learning using the composite parallel translation data and performs the machine translation process for machine-translating source language data into target language data using the learned model. In a learning process using the first batch set data, the translation unit performs the learning process at the first learning rate, and in a learning process using the second batch set data, the translation unit performs the learning process at the second learning rate.

Using pseudo parallel corpus data having diversity that is obtained in large quantities by obtaining multiple pieces of pseudo source language data from one pieces of target language data using a monolingual corpus of the target language, the machine translation processing apparatus can efficiently perform the learning process (training process) for constructing a learning model for machine translation. Further, the machine translation processing apparatus uses both the pseudo parallel corpus data having diversity, which has been obtained in large quantities, and the base parallel corpus data in a small quantity but with high accuracy, with the applied learning rates changed accordingly, to perform the learning process (training process) for the machine translation model. This allows the machine translation processing apparatus to obtain a learned model (machine translation model) with very high accuracy.

A fifth aspect of the present invention provides the machine translation processing apparatus of the fourth aspect of the present invention in which the first learning rate is greater than the second learning rate.

This allows the machine translation processing apparatus to increase the learning rate of the learning process (training process) using the base parallel corpus data in a small quantity but with high accuracy, and to lower the learning rate of the learning process (training process) using the pseudo parallel corpus data in large quantities but with accuracy lower than that of the base parallel corpus data. As a result, the machine translation processing apparatus can obtain a machine translation learned model with high accuracy.

A sixth aspect of the invention provides a pseudo parallel translation data generation method including a back-translation step and a pseudo parallel translation data obtaining step.

The back-translation step performs a machine back-translation process on one piece of target language data obtained from a target language monolingual corpus to obtain N pieces of pseudo source language data. N is a natural number equal to or greater than two.

The pseudo parallel translation data obtaining step pairs the one piece of target language data and each of the N pieces of pseudo source language data obtained by the back-translation step to obtain N sets of pseudo parallel translation data.

This achieves a pseudo parallel translation data generation method having the same advantageous effects as the pseudo parallel translation data generation apparatus of the first aspect of the present invention.

Advantageous Effects

The present invention provides a model training method for neural machine translation that enhances the accuracy of the entire translator by enhancing the performance of an encoder (including an attention mechanism) using a monolingual corpus of a target language and provides a machine translation system for performing the model training method. Further, the present invention provides a pseudo parallel translation data generation apparatus and a machine translation processing apparatus for the above-described machine translation system, and a pseudo parallel translation data generation method performed in the machine translation system.

BRIEF DESCRIPTION OF THE DRAWINGS

FIG. 12 is a diagram showing an example of pseudo source language group data D1_e_N obtained by the back-translation unit 11.

DESCRIPTION OF THE PREFERRED EMBODIMENTS

First Embodiment

A first embodiment will be described below with reference to the drawings.

1.1: Configuration of Machine Translation System

Figure 1:
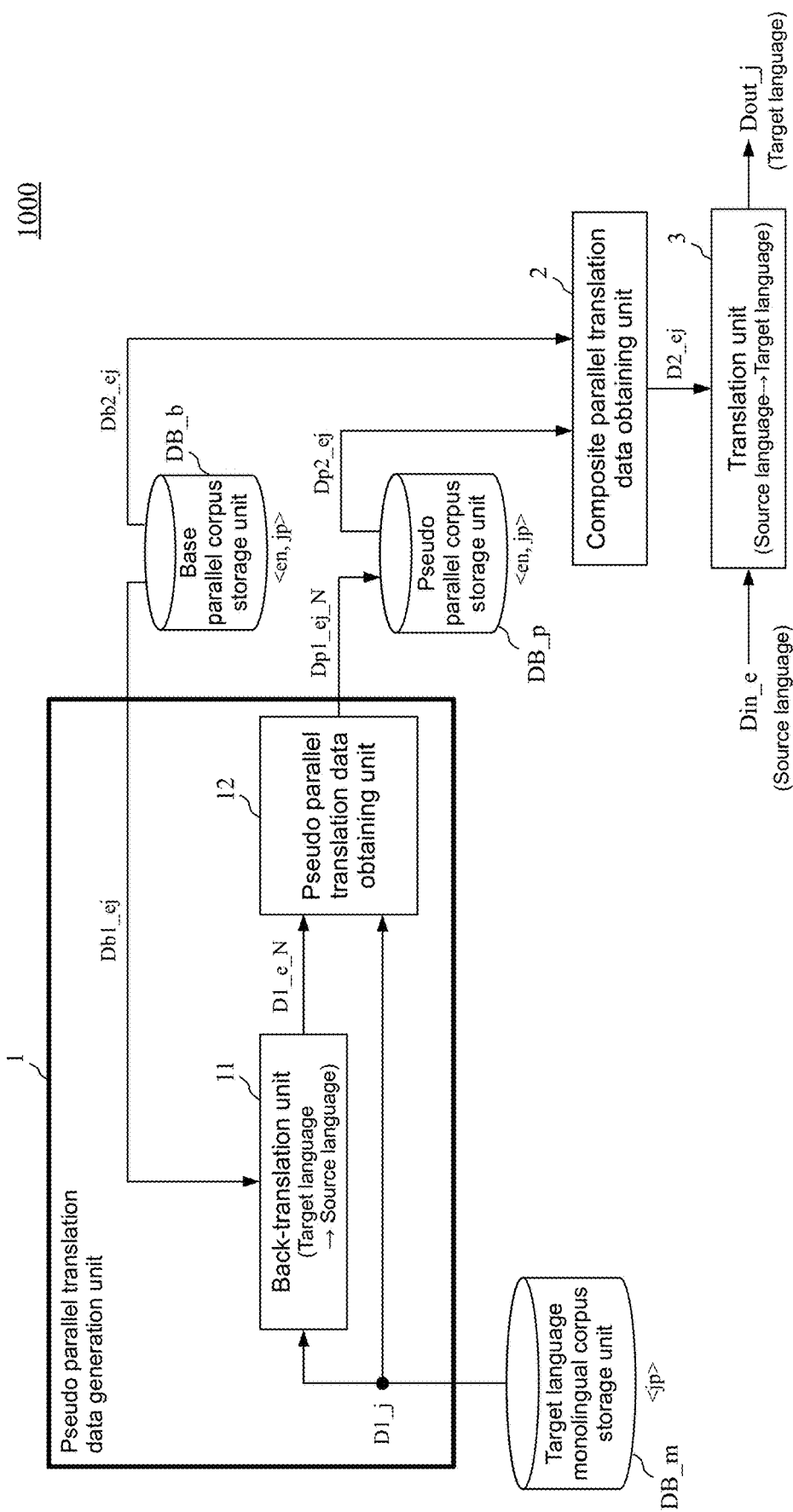
FIG. 1 is a schematic configuration diagram of a machine translation system 1000 according to a first embodiment.

FIG. 1 is a schematic configuration diagram of a machine translation system 1000 according to a first embodiment.

Figure 2:
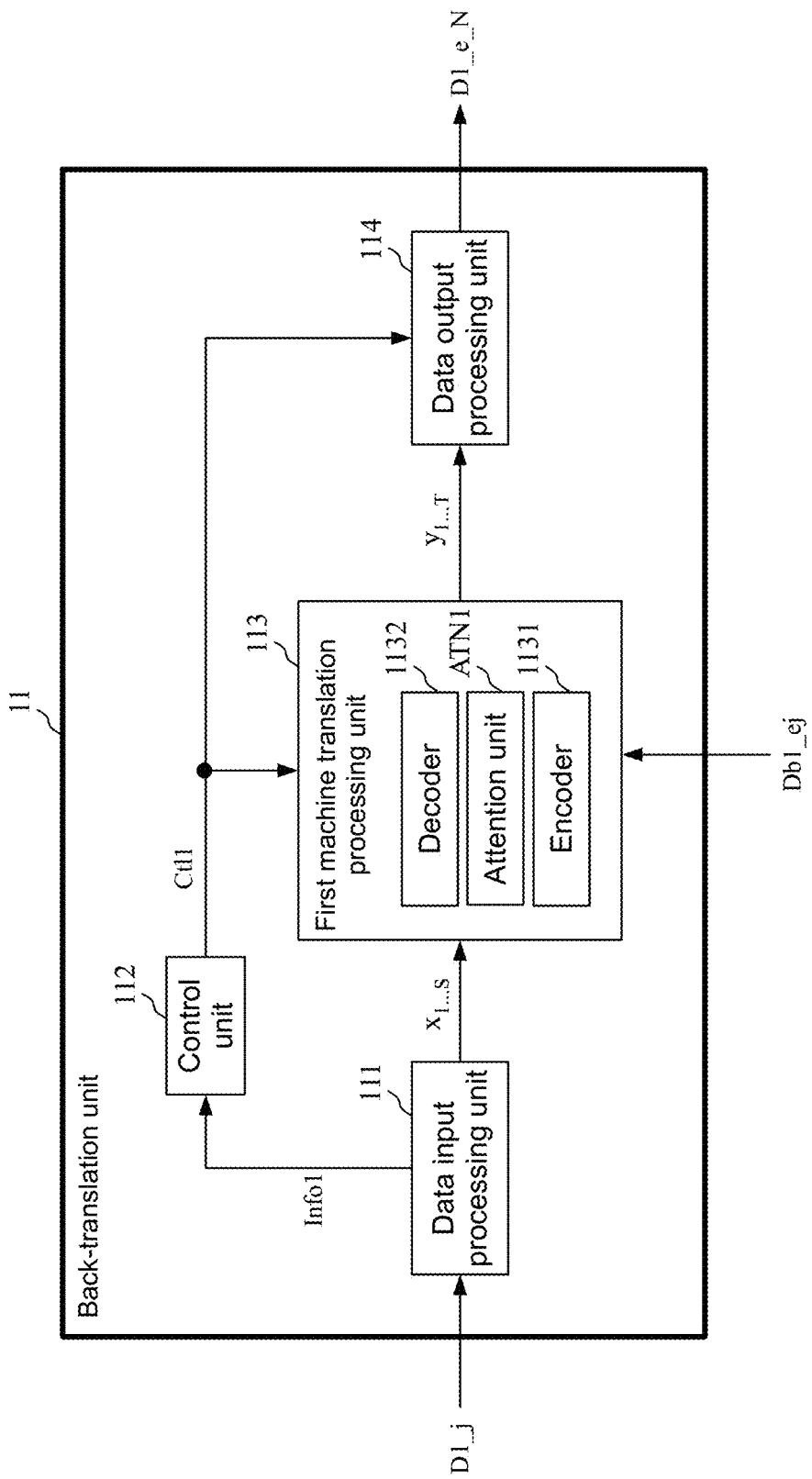
FIG. 2 is a schematic configuration diagram of a back-translation unit 11 of a pseudo parallel translation data generation unit 1 according to the first embodiment.

FIG. 2 is a schematic configuration diagram of a back-translation unit 11 of the pseudo parallel translation data generation unit 1 according to the first embodiment.

Figure 3:
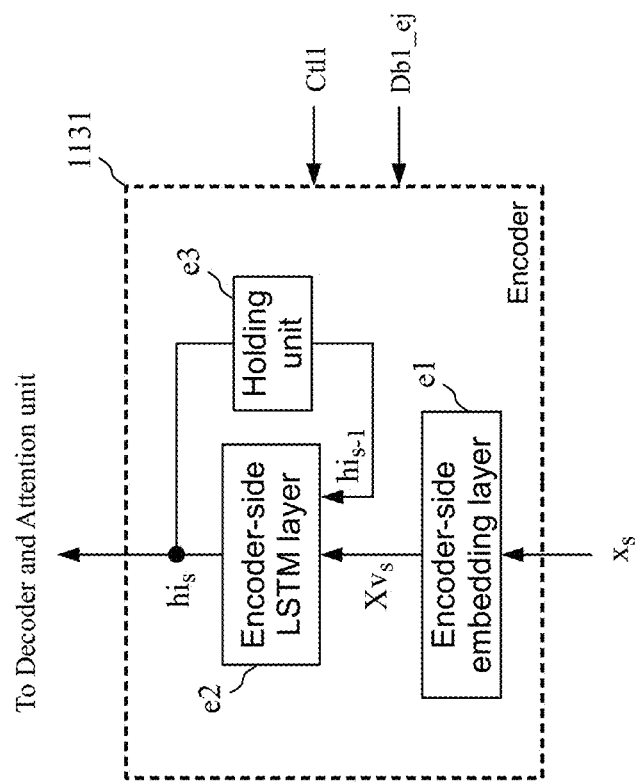
FIG. 3 is a schematic configuration diagram of an encoder 1131 of a first machine translation processing unit 113 according to the first embodiment.

FIG. 3 is a schematic configuration diagram of an encoder 1131 of the first machine translation processing unit 113 according to the first embodiment.

Figure 4:
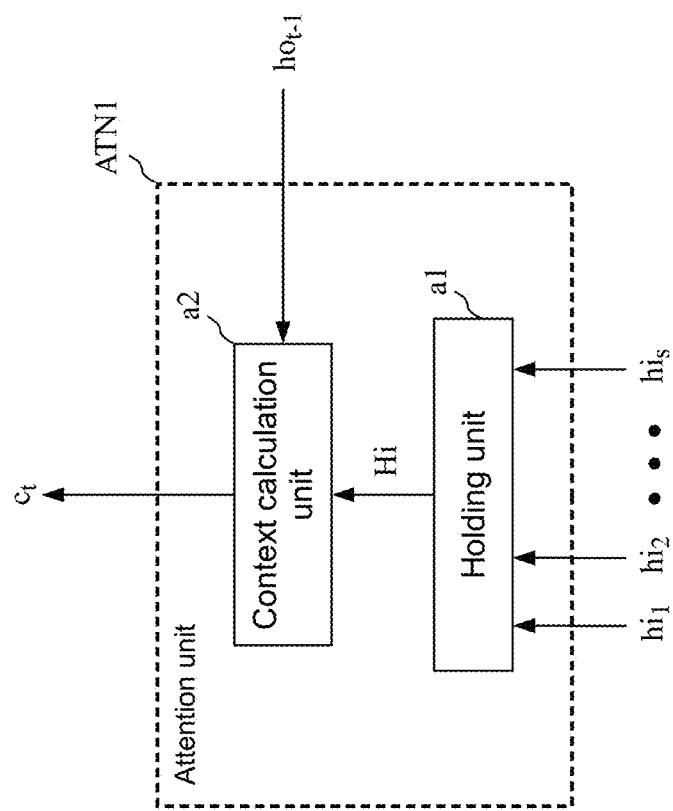
FIG. 4 is a schematic configuration diagram of an attention unit ATN1 of the first machine translation processing unit 113 according to the first embodiment.

FIG. 4 is a schematic configuration diagram of an attention unit ATN1 of the first machine translation processing unit 113 according to the first embodiment.

Figure 5:
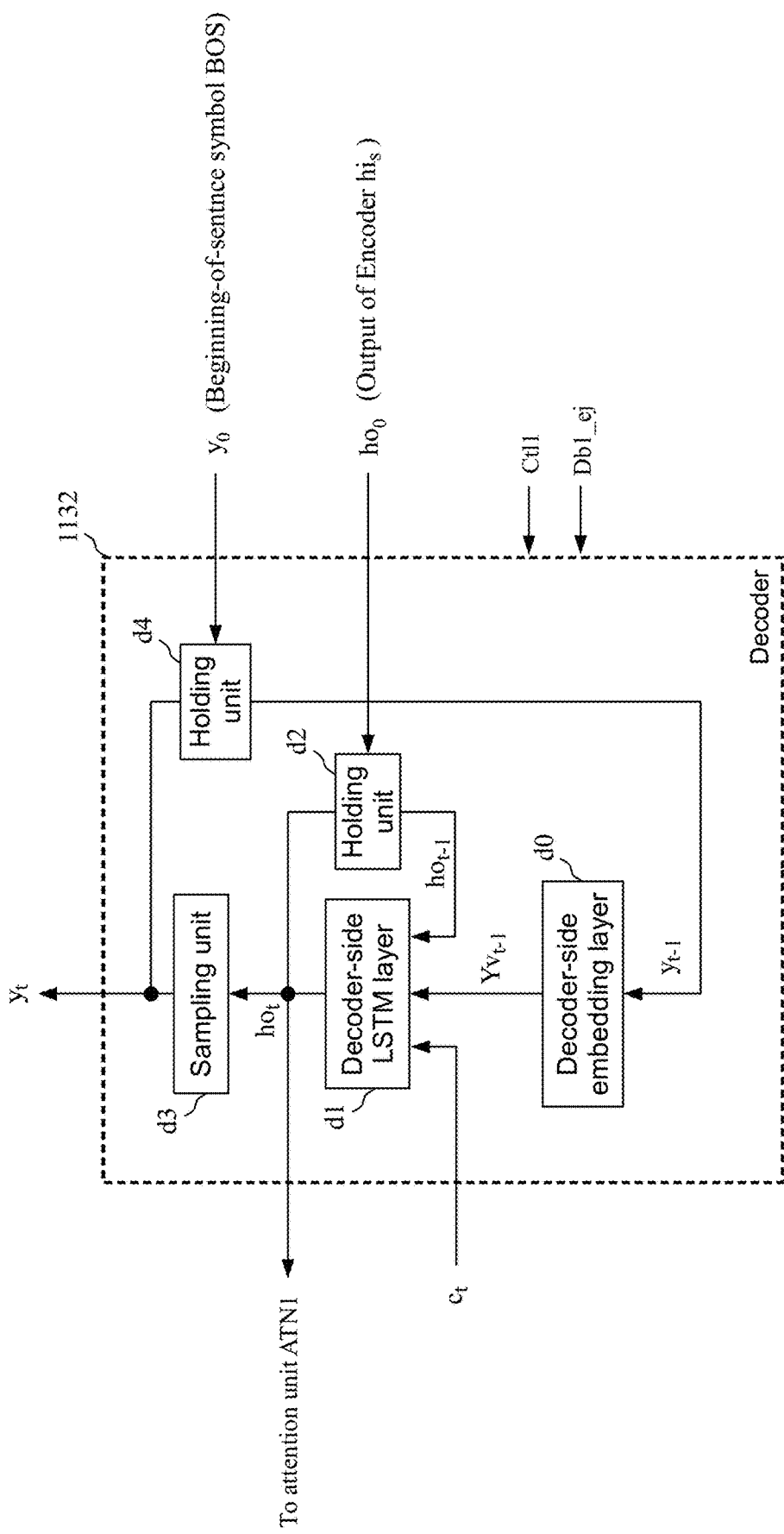
FIG. 5 is a schematic configuration diagram of a decoder 1132 of the first machine translation processing unit 113 according to the first embodiment.

FIG. 5 is a schematic configuration diagram of a decoder 1132 of the first machine translation processing unit 113 according to the first embodiment.

Figure 6:
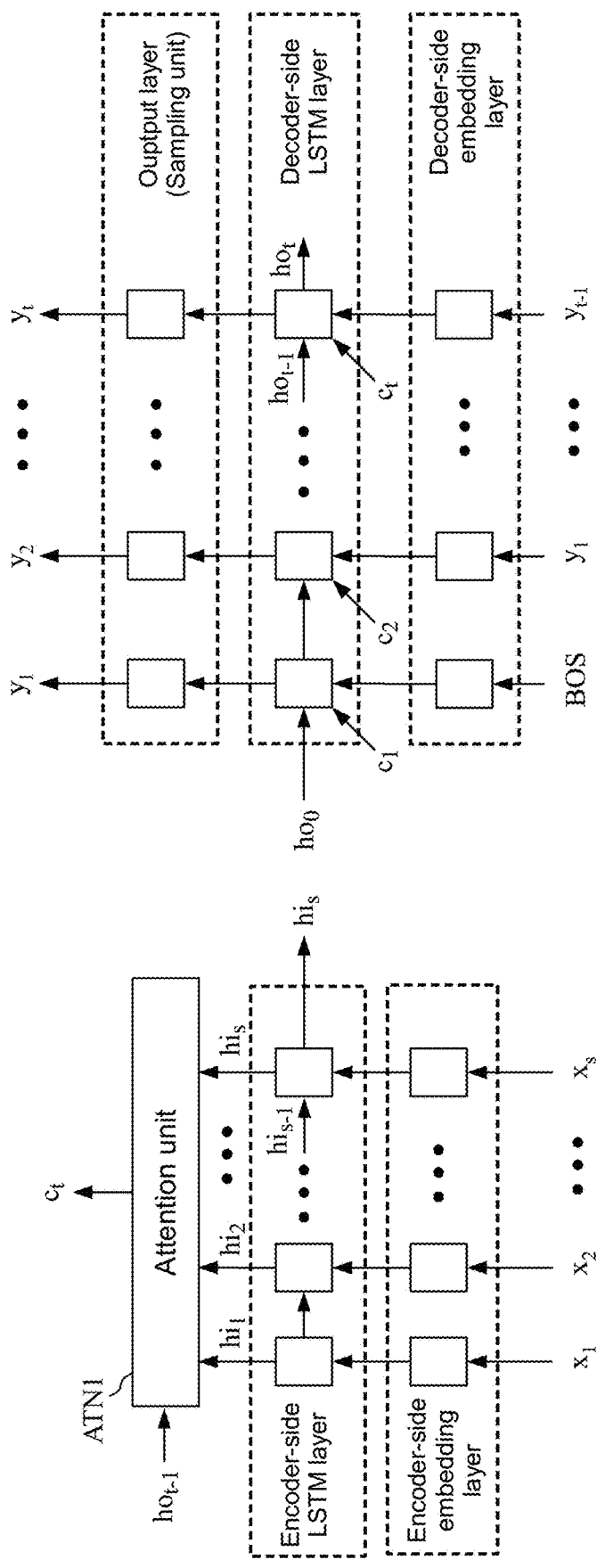
FIG. 6 is a transition diagram schematically showing a machine translation process in the first machine translation processing unit 113 of the first embodiment.

FIG. 6 is a transition diagram schematically showing a machine translation process in the first machine translation processing unit 113 according to the first embodiment.

Figure 7:
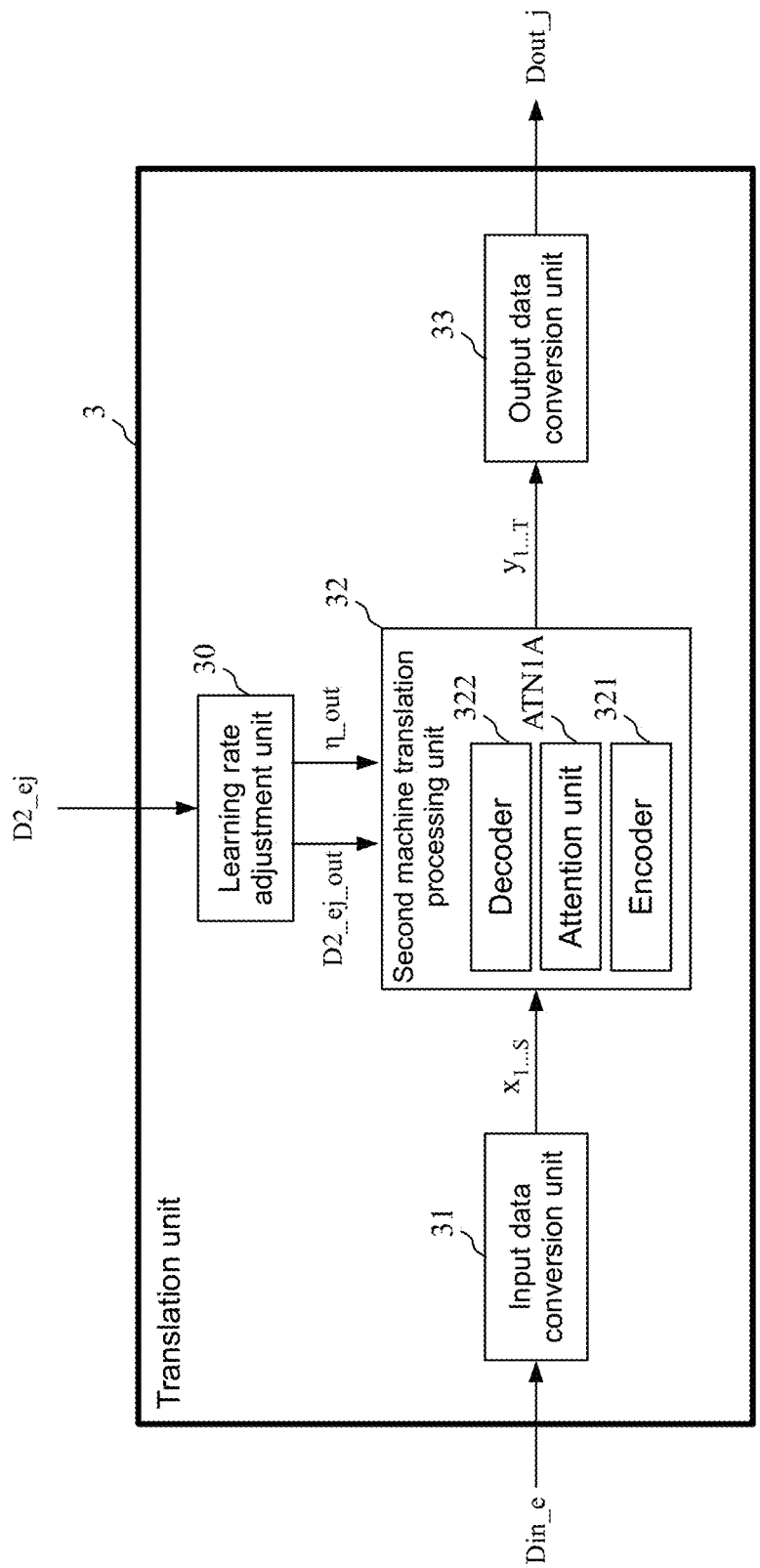
FIG. 7 is a schematic configuration diagram of a translation unit 3 according to the first embodiment.

FIG. 7 is a schematic configuration diagram of a translation unit 3 according to the first embodiment.

Figure 8:
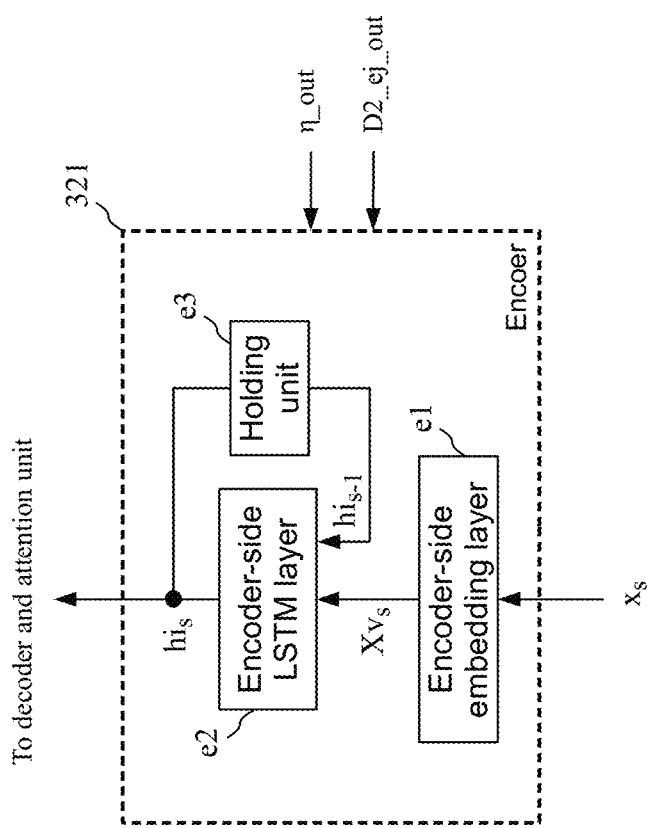
FIG. 8 is a schematic configuration diagram of an encoder 321 of a second machine translation processing unit 32 according to the first embodiment.

FIG. 8 is a schematic configuration diagram of an encoder 321 of a second machine translation processing unit 32 according to the first embodiment.

Figure 9:
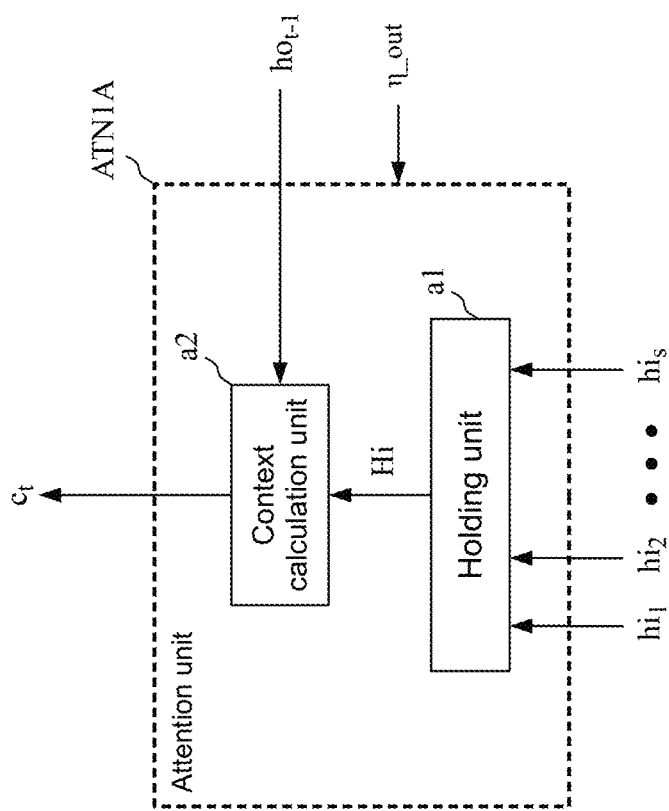
FIG. 9 is a schematic configuration diagram of an attention unit ATN1A of the second machine translation processing unit 32 of the first embodiment.

FIG. 9 is a schematic configuration diagram of an attention unit ATN1A of the second machine translation processing unit 32 according to the first embodiment.

Figure 10:
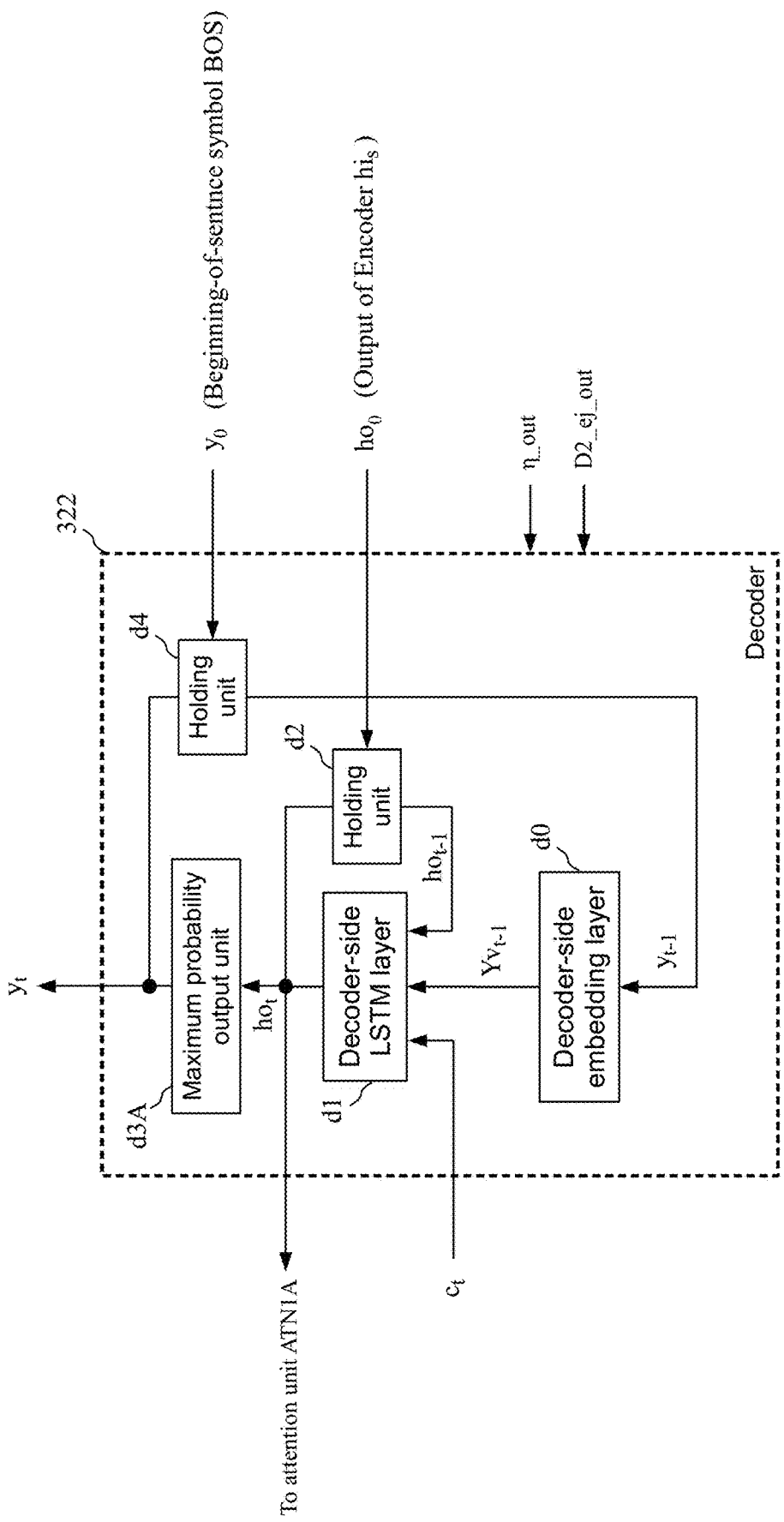
FIG. 10 is a schematic configuration diagram of a decoder 322 of the second machine translation processing unit 32 of the first embodiment.

FIG. 10 is a schematic configuration diagram of a decoder 322 of the second machine translation processing unit 32 according to the first embodiment.

Figure 11:
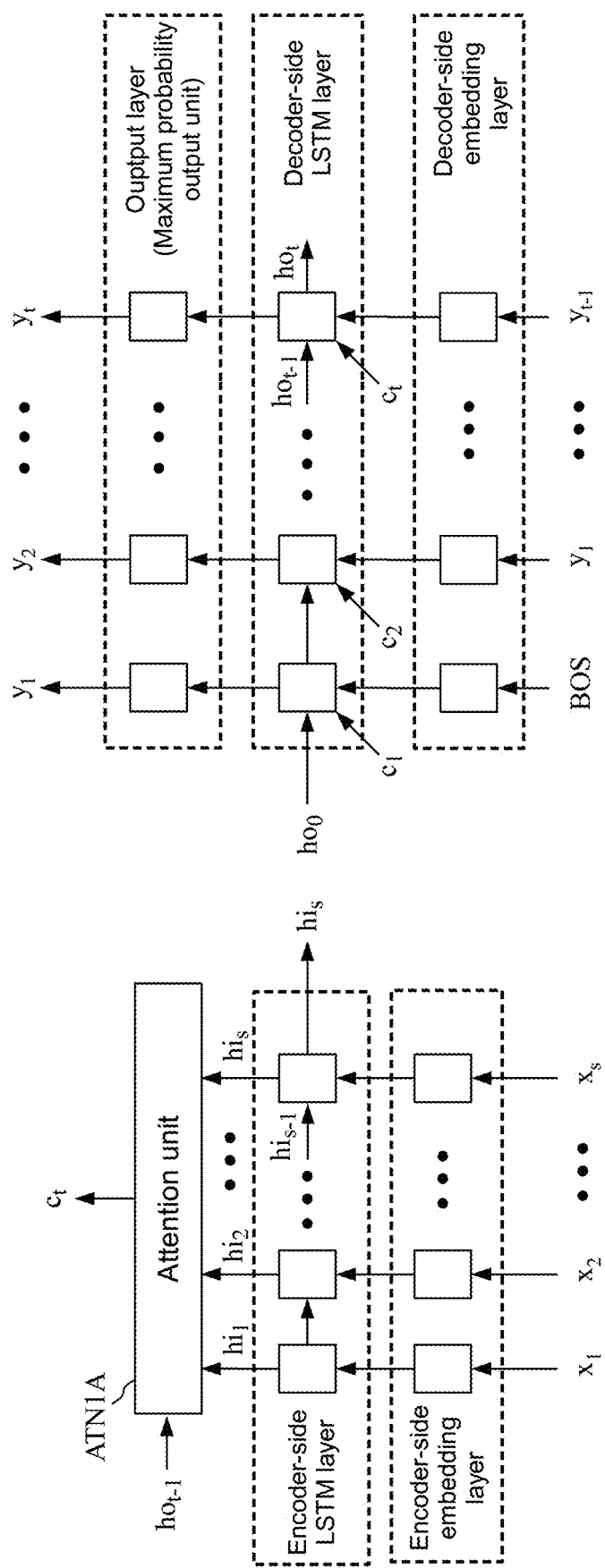
FIG. 11 is a transition diagram schematically showing a machine translation process in the second machine translation processing unit 32 of the first embodiment.
Figure 13:
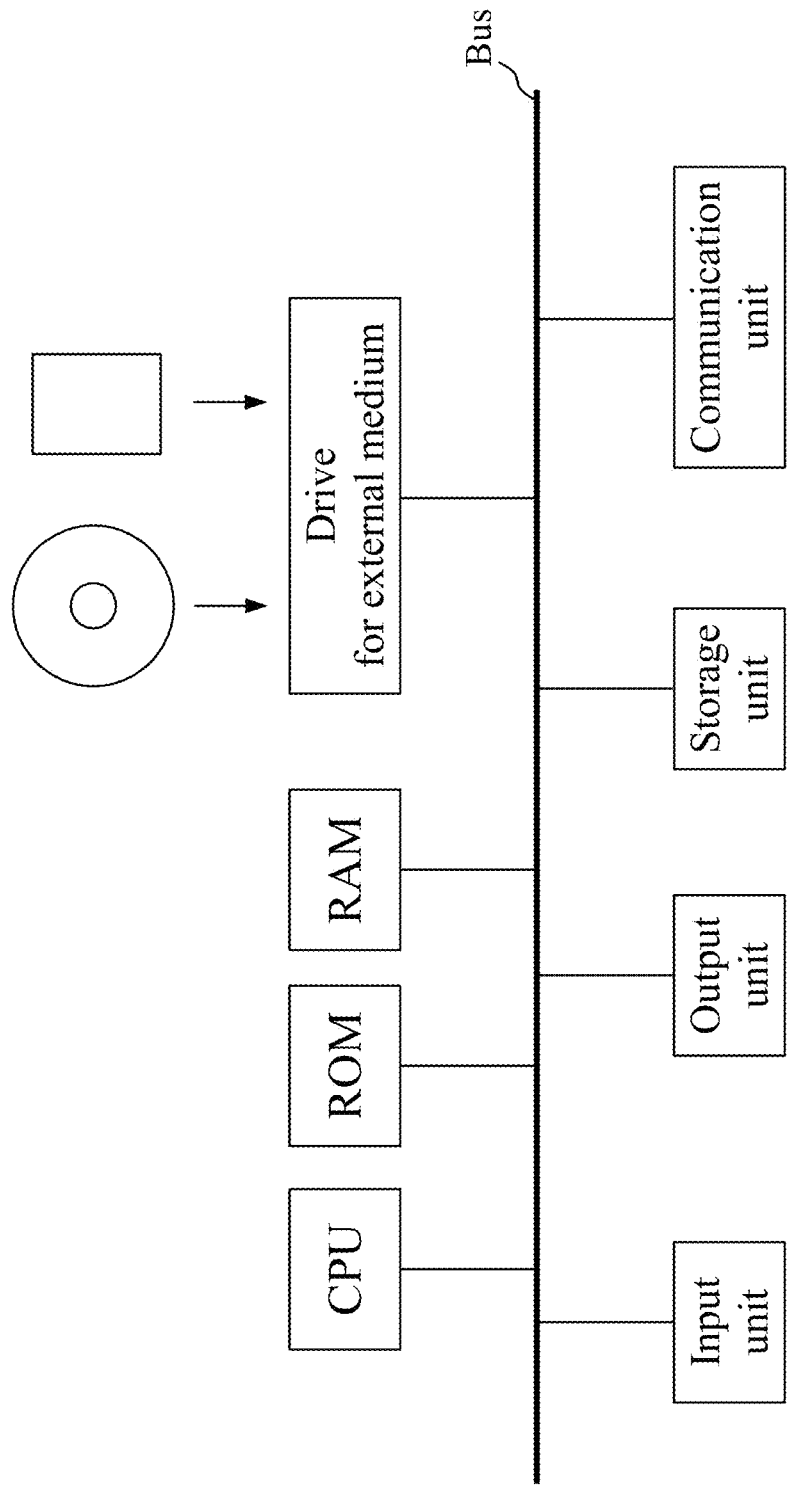
FIG. 13 is a diagram showing an exemplary configuration with a CPU bus.

FIG. 11 is a transition diagram schematically showing a machine translation process in the second machine translation processing unit 32 of the first embodiment.

As shown in FIG. 1, the machine translation system 1000 includes a pseudo parallel translation data generation unit 1, a composite parallel translation data obtaining unit 2, a translation unit 3, a base parallel corpus storage unit DB_b, and a target language monolingual corpus storage unit DB_m, and a pseudo parallel corpus storage unit DB_p.

As shown in FIG. 1, the pseudo parallel translation data generation unit 1 includes a back-translation unit 11 and a pseudo parallel translation data obtaining unit 12.

The back-translation unit 11 receives base parallel translation data Db1_ej from the base parallel corpus storage unit DB_b, and also receives target language data D1_j from the target language monolingual corpus storage unit DB_m. The back-translation unit 11 performs a learning process using the base parallel translation data Db_ej, and obtains a learned model for machine translation of the target language into the source language. The back-translation unit 11 then performs a machine translation process on one target language data D1_j using the learned model to obtain N pieces of pseudo source language data (N is a natural number equal to or greater than two) as source language group data D1_e_N. The back-translation unit 11 then transmits the obtained pseudo source language group data D1_e_N to the pseudo parallel translation data obtaining unit 12.

As shown in FIG. 2, the back-translation unit 11 includes a data input processing unit 111, a control unit 112, a first machine translation processing unit 113, and a data output processing unit 114.

The data input processing unit 111 reads the target language data D1_j from the target language monolingual corpus storage unit DB_m and transmits, to the control unit 112, data Info1 indicating that the target language data D1_j has been read. In addition, the data input processing unit 111 converts the target language data D1_j into data $x_{1...S}$ having a data format that can be machine-translated by the first machine translation processing unit 113, and then transmits the converted data $x_{1...S}$ to the first machine translation processing unit 113. Note that the data $x_{1...S}$ is a series of symbols such as a word sequence, a final symbol thereof is an end-of-sentence symbol (represented as EOS), and the number of symbols including EOS is S.

The control unit 112 receives the data Info1 transmitted from the data input processing unit 111, generates a control signal Ctl1 based on the data Info1, and transmits the generated control signal Ctl1 to the first machine translation processing unit 113 and the data output processing unit 114. The control unit 112 transmits a control signal Ctl1 to the first machine translation processing unit 113, and controls the first machine translation processing unit 113 so that the first machine translation processing unit 113 performs the machine translation process multiple times (N times) for one piece of target language data D1_j. In addition, the control unit 112 transmits a control signal Ctl1 to the data output processing unit 114, and controls the data output processing unit 114 so that N pieces of machine translation processing result data (data D1_e) for one piece of target language data D1_j is obtained in the data output processing unit 114.

The first machine translation processing unit 113 is a functional unit that performs a neural machine translation process using encoder/decoder architecture. In a learning mode (a mode in which a learning process is performed), the first machine translation processing unit 113 reads the base parallel translation data Db_ej from the base parallel corpus DB_b, performs the learning process using the base parallel translation data Db_ej as learning data to construct a learned model. The first machine translation processing unit 113 performs the machine translation process on the data $x_{1...S}$ received from the data input processing unit 111 in an execution mode (a mode in which the machine translation process is performed using the learned model) to obtain output data $y_{1...T}$. Note that the data $y_{1...T}$ is a series of symbols such as a word sequence, a final symbol thereof is an end-of-sentence symbol (EOS), and the number of symbols including EOS is T. The first machine translation processing unit 113 then transmits the obtained output data $y_{1...T}$ to the data output processing unit 114. Based on the control signal Ctl1 transmitted from the control unit 112, the first machine translation processing unit 113 performs the machine translation process multiple times for one piece of target language data D1_j.

As shown in FIGS. 3 to 5, the first machine translation processing unit 113 includes an encoder 1131, a decoder 1132, and an attention unit ATN1.

The encoder 1131 includes an encoder-side embedding layer e1, an encoder-side LSTM layer (LSTM: Long short-term memory) e2, and a holding unit e3.

The encoder-side embedding layer e1 performs matrix transformation on one symbol $x_s$ included in the input data $x_{1...S}$ using a matrix for performing an embedding process, thereby obtaining embedding data $Xv_s$. The encoder-side embedding layer e1 then transmits the obtained embedding data $Xv_s$ to the encoder-side LSTM layer e2.

The encoder-side LSTM layer e2 receives the embedding data $Xv_s$ and input-side hidden state data $hi_{s-1}$ at time s−1 transmitted from the holding unit e3. The encoder-side LSTM layer e2 obtains an input-side hidden state data $hi_s$ at time s from the embedding data $Xv_s$ and the input-side hidden state data $hi_{s-1}$. The encoder-side LSTM layer e2 then transmits the obtained input-side hidden state data $hi_s$ to the holding unit e3 and the attention unit ATN1.

The holding unit e3 receives and stores the input-side hidden state data $hi_s$ at time s transmitted from the encoder-side LSTM layer e2, and also transmits the input-side hidden state data $hi_{s-1}$ at time s−1, which is one-time-step previous to the current time, to the encoder-side LSTM layer e2. Note that the time s is a timing when data currently being processed is received, the time s−1 is a timing when a symbol one-time-step previous to the input of the time s is received, and the time s+1 is a timing when a symbol one-time-step after the time s is received.

The encoder 1131 repeats the above process from time 1 to S, and when time S is reached, the encoder 1131 transmits the input-side hidden state data $hi_S$ transmitted from the encoder-side LSTM layer e2 to the decoder 1132.

The decoder 1132 includes a decoder-side embedding layer d0, a decoder-side LSTM layer d1, a holding unit d2, a sampling unit d3, and a holding unit d4.

First the decoder 1132 stores the input-side hidden state data $hi_S$ transmitted from the encoder 1131 in the holding unit d2 as an initial value $ho_0$ of the output-side hidden state data. Also, the beginning-of-sentence symbol (BOS) is stored in the holding unit d4 as an initial value $y_0$ of the output symbol.

At time t−1 that is a timing one-time-step previous to time t, the decoder-side embedding layer d0 obtains, from the holding unit d2, output data $y_{t-1}$ at time t−1, and performs matrix transformation on the obtained data using a matrix for performing the embedding process, thereby obtaining embedding data $Yv_{t-1}$. The decoder-side embedding layer d0 then transmits the obtained embedding data $Yv_{t-1}$ to the decoder-side LSTM layer d1.

The decoder-side LSTM layer d1 receives context state data $c_t$ transmitted from the attention unit ATN1, output-side hidden state data $ho_{t-1}$ at time t−1 transmitted from the holding unit d2, and embedding data $Yv_{t-1}$ at time$_{t-1}$ transmitted from the holding unit d4. The decoder-side LSTM layer d1 obtains output-side hidden state data $ho_t$ at time t from the context state data $c_t$, the output-side hidden state data $ho_{t-1}$, and the embedding data $Yv_{t-1}$, and transmits the obtained output-side hidden state data $ho_t$ to the sampling unit d3, the holding unit d2, and the attention unit ATN1.

The holding unit d2 receives and stores the output-side hidden state data $ho_t$ at time t transmitted from the decoder-side LSTM layer d1, and also transmits the output-side hidden state data $ho_{t-1}$ at time t−1 to the decoder-side LSTM layer d1.

The sampling unit d3 receives the output-side hidden state data $ho_t$ transmitted from the decoder-side LSTM layer d1. The sampling unit d3 obtains output symbol $y_t$ at time t from the output-side hidden state data $ho_t$, and transmits the obtained output symbol $y_t$ to the data output processing unit 114 and the holding unit d4.

The holding unit d4 receives and stores the output symbol $y_t$ at time t transmitted from the sampling unit d3, and also transmits the output symbol $y_{t-1}$ at time t−1 to the decoder-side embedding layer d0.

As shown in FIG. 4, the attention unit ATN1 includes a holding unit a1 and a context calculation unit a2.

The holding unit a1 stores the input-side hidden state data $hi_s$ transmitted from the encoder for all timings s from 1 to S. The input-side hidden state data at all timings from 1 to S are collectively referred to as Hi.

The context calculation unit a2 receives the input-side hidden state data Hi at all timings stored by the holding unit a1 and the output-side hidden state data $ho_{t-1}$ transmitted from the decoder-side LSTM layer d1. The context calculation unit a2 obtains the context state data $c_t$ at time t from the input-side hidden state data Hi at all timings and the output-side hidden state data $ho_{t-1}$. The context calculation unit a2 then transmits the obtained context state data $c_t$ to the decoder side LSTM layer d1.

The first machine translation processing unit 113 is configured as described above, and performs the machine translation process based on state transition as shown in FIG. 6. When the output symbol $y_t$ becomes the end-of-sentence symbol EOS, T representing the number of symbols of the output data is set to t to obtain output data $y_{1 \ldots T}$.

The data output processing unit 114 receives the output data $y_{1 \ldots T}$ transmitted from the first machine translation processing unit 113 and the control signal Ctl1 transmitted from the control unit 112. After the machine translation result data corresponding to the data D1_j is obtained, the data output processing unit 114 obtains, from the obtained data $y_{1 \ldots T}$, data D1_e that is the machine translation result data corresponding to the data D1_j.

The data output processing unit 114 obtains N pieces of machine translation result data D1_e based on the control signal Ctl1, and then transmits, to the pseudo parallel translation data obtaining unit 12, data containing the N pieces of machine translation result data D1_e as pseudo source language group data D1_e_N.

The pseudo parallel translation data obtaining unit 12 receives the target language data D1_j from the target language monolingual corpus storage unit DB_m and also receives the pseudo source language group data D1_e_N transmitted from the back-translation unit 11. The pseudo parallel translation data obtaining unit 12 generates data in which the target language data D1_j and N pieces of pseudo source language data D1_e included in the pseudo source language group data D1_e_N are paired, and then transmits the generated N sets of data as pseudo parallel translation data Dp1_ej_N to the pseudo parallel corpus storage unit DB_p.

The composite parallel translation data obtaining unit 2 reads pseudo parallel translation data Dp2_ej from the pseudo parallel corpus storage unit DB_p and also reads base parallel translation data Db2_ej from the base parallel corpus DB_b. The composite parallel translation data obtaining unit 2 performs a process of combining the parallel translation data for the pseudo parallel translation data Dp2_ej and the base parallel translation data Db2_ej while associating a learning rate η thereto, thereby obtaining composite parallel translation data D2_ej. The composite parallel translation data obtaining unit 2 then transmits the composite parallel translation data D2_ej associated with the learning rate η to the translation unit 3.

As shown in FIG. 7, the translation unit 3 includes a learning rate adjustment unit 30, an input data conversion unit 31, a second machine translation processing unit 32, and an output data conversion unit 33.

The learning rate adjustment unit 30 receives the composite parallel translation data D2_ej associated with the learning rate η transmitted from the composite parallel translation data obtaining unit 2. When transmitting parallel translation data obtained from the base parallel corpus DB_b to the encoder 321 and the decoder 322, the learning rate adjustment unit 30 sets an output learning rate η_out to the corresponding learning rate η (for example, η0) and then transmits it. Conversely, when transmitting parallel translation data obtained from the pseudo parallel translation corpus storage unit DB_p to the encoder 321 and the decoder 322, the learning rate adjustment unit 30 sets the output learning rate η_out to the corresponding learning rate η (for example, η0/N) and then transmits it. Note that the learning rate adjustment unit 30 also transmits the output learning rate η_out to the attention unit ATN1.

The input data conversion unit 31 converts source language data Din_e into data $x_{1 \ldots S}$ having a data format for which the second machine translation processing unit 32 can perform machine translation, and then transmits the converted data $x_{1 \ldots S}$ to the second machine translation processing unit 32. Note that the data $x_{1 \ldots S}$ is a series of symbols such as a word sequence, a final symbol thereof is an end-of-sentence symbol (represented as EOS), and the number of symbols including EOS is S.

As shown in FIGS. 8 to 10, the second machine translation processing unit 32 includes an encoder 321, a decoder 322, and an attention unit ATN1A.

The encoder 321 includes an encoder-side embedding layer e1, an encoder-side LSTM layer (LSTM: Long short-term memory) e2, and a holding unit e3. In addition, the encoder 321 receives the output learning rate η_out transmitted from the learning rate adjustment unit 30 and performs learning (parameter adjustment) based on the output learning rate η_out during learning.

The encoder-side embedding layer e1 performs matrix transformation on one symbol $x_s$ included in the input data $x_{1 \ldots S}$ using a matrix for performing the embedding process to obtain embedding data $Xv_s$. The encoder-side embedding layer e1 then transmits the obtained embedding data $Xv_s$ to the encoder-side LSTM layer e2.

The encoder-side LSTM layer e2 receives embedding data $Xv_s$ and input-side hidden state data $hi_{s-1}$ at time s−1 transmitted from the holding unit e3. The encoder-side LSTM layer e2 obtains input-side hidden state data $hi_s$ at time s from the embedding data $Xv_s$ and the input-side hidden state data $hi_{s-1}$. The encoder-side LSTM layer e2 then transmits the obtained input-side hidden state data $hi_s$ to the holding unit e3, the attention unit ATN1A, and the decoder-side LSTM layer d1.

The holding unit e3 receives and stores the input-side hidden state data $hi_s$ at time s transmitted from the encoder-side LSTM layer e2, and also transmits the input-side hidden state data $hi_{s-1}$ at time s−1, which is one-time-step previous to the current time, to the encoder-side LSTM layer e2.

The encoder 321 repeats the above process from time 1 to S, and when time S is reached, the encoder 321 transmits the input-side hidden state data $hi_S$ transmitted from the encoder-side LSTM layer e2 to the decoder 322.

The decoder 322 includes a decoder-side embedding layer d0, a decoder-side LSTM layer d1, a holding unit d2, a maximum probability output unit d3A, and a holding unit d4. In addition, the decoder 322 receives the output learning rate η_out transmitted from the learning rate adjustment unit 30 and performs learning (parameter adjustment) based on the output learning rate η_out during learning.

First, the decoder 322 stores the input-side hidden state data $hi_S$ transmitted from the encoder 321 in the holding unit d2 as an initial value $ho_0$ of the output-side hidden state data. Also, the beginning-of-sentence symbol (BOS) is stored in the holding unit d4 as an initial value $y_0$ of the output symbol.

At time t−1 that is a timing one-time-step previous to time t, the decoder-side embedding layer d0 obtains an output symbol $y_{t-1}$ at time t−1 from the holding unit d2 for the time t−1 immediately before a certain time t, and performs matrix transformation using a matrix for performing the embedding process, thereby obtaining embedding data $Yv_{t-1}$. The decoder-side embedding layer d0 then transmits the obtained embedding data $Yv_{t-1}$ to the decoder-side LSTM layer d1.

The decoder-side LSTM layer d1 receives the context state data $c_t$ transmitted from the attention unit ATN1A, the output-side hidden state data $ho_{t-1}$ at time t−1 transmitted from the holding unit d2, and the embedding data $Yv_{t-1}$ at time t−1 transmitted from the holding unit d4. The decoder-side LSTM layer d1 obtains the output-side hidden state data $ho_t$ at time t from the context state data $c_t$, the output-side hidden state data $ho_{t-1}$, and the embedding data $Yv_{t-1}$, and transmits the obtained output-side hidden state data $ho_t$ to the maximum probability output unit d3A, the holding unit d2, and the attention unit ATN1A.

The holding unit d2 receives and stores the output-side hidden state data $ho_t$ at time t transmitted from the decoder side LSTM layer d1, and also transmits the output-side hidden state data $ho_{t-1}$ at time t−1 to the decoder side LSTM layer d1.

The maximum probability output unit d3A receives the output-side hidden state data $ho_t$ transmitted from the decoder side LSTM layer d1. The maximum probability output unit d3A firstly calculates word output distribution $Yo_t$ at time t from the output-side hidden state data $ho_t$, obtains the output symbol $y_t$ from the word output distribution $Yo_t$, and then transmits the obtained output symbol $y_t$ to the data output processing unit 114 and the holding unit d4. The word output distribution $Yo_t$ is data indicating all output symbol candidates in a posterior probability distribution; the maximum probability output unit d3A selects data having the maximum probability from the word output distribution $Yo_t$, and then outputs an output symbol $y_t$ corresponding to the selected data.

The holding unit d4 receives and stores the output symbol $y_t$ at time t outputted from the maximum probability output unit d3A, and transmits the output symbol $y_{t-1}$ at time t−1 to the decoder-side LSTM layer d1.

As shown in FIG. 9, the attention unit ATN1A includes a holding unit a1 and a context calculation unit a2.

The holding unit a1 records the input-side hidden state data $hi_s$ transmitted from the encoder for all times s from 1 to S. The input-side hidden state data at all times from 1 to S are collectively referred to as Hi.

The context calculation unit a2 receives the input-side hidden state data Hi at all times held by the holding unit a1, the output-side hidden state data $ho_{t-1}$ transmitted from the decoder-side LSTM layer d1, and the output learning rate η_out transmitted from the learning rate adjustment unit 30. The context calculation unit a2 obtains the context state data $c_t$ at time t from the input-side hidden state data Hi at all times and the output-side hidden state data $ho_{t-1}$. The context calculation unit a2 then transmits the obtained context state data $c_t$ to the decoder-side LSTM layer d1. The attention unit ATN1A performs learning (parameter adjustment) based on the output learning rate η_out during learning.

The second machine translation processing unit 32 is configured as described above, and performs the machine translation process based on state transitions as shown in FIG. 11. When the output symbol $y_t$ becomes the end-of-sentence symbol EOS, the second machine translation processing unit 32 sets the number T of symbols of the output data to t, and obtains output data $y_{1 \ldots T}$.

The output data conversion unit 33 receives the output data $y_{1 \ldots T}$ transmitted from the second machine translation processing unit 32. The output data conversion unit 33 continues to obtain the output symbols $y_t$ transmitted from the second machine translation processing unit 32 in order from $y_1$; when $y_t$ becomes an end-of-sentence symbol (EOS), the output data conversion unit 33 considers that the translation result data corresponding to data Din_e is complete, then setting T to the number of output symbols. After the machine translation result data corresponding to the source language data Din_e is obtained, the output data conversion unit 33 obtains target language data Dout_j from the obtained data $y_{1...T}$, and then outputs the target language data Dout_j.

The base parallel corpus storage unit DB_b stores, for example, parallel corpus data of a source language and a target language generated by a person. Thus, the parallel corpus data stored in the base parallel corpus storage unit DB_b is highly accurate parallel translation data. The base parallel corpus storage unit DB_b is achieved by using a database, for example.

The target language monolingual corpus storage unit DB_m stores monolingual corpus data of the target language. The target language monolingual corpus storage unit DB_m is achieved by using a database, for example.

The pseudo parallel corpus storage unit DB_p stores the pseudo parallel translation data Dp1_ej_N transmitted from the pseudo parallel translation data obtaining unit 12.

<1.2: Operation of Machine Translation System>

The operation of the machine translation system 1000 configured as described above will be described.

(1.2.1: Pseudo Parallel Translation Data Generation Process)

First, a pseudo parallel translation data generation process in the machine translation system 1000 will be described.

In the learning mode (the mode in which the learning process is performed), the back-translation unit 11 of the pseudo parallel translation data generation unit 1 reads the base parallel translation data Db_ej from the base parallel corpus DB_b and performs the learning process using the base parallel translation data Db_ej as learning data, thereby constructing a learned model.

Next, the back-translation unit 11 of the pseudo parallel translation data generation unit 1 causes the data input processing unit 111 to read the target language data D1_j from the target language monolingual corpus storage unit DB_m. The data input processing unit 111 transmits data Info1 indicating that the target language data D1_j has been read to the control unit 112. Further, the data input processing unit 111 converts the target language data D1_j into data $x_{1...S}$ having a data format that can be subjected to a machine translation process by the first machine translation processing unit 113, and then transmits the data $x_{1...S}$ to the first machine translation processing unit 113.

The first machine translation processing unit 113 performs the machine translation process on the data $x_{1...S}$ inputted from the data input processing unit 111 in the execution mode (a mode in which the machine translation process is performed using a learned model obtained by learning with the base parallel translation data Db_ej). Specifically, the machine translation process from the target language to the source language is performed in the back-translation unit 11 as below.

One symbol xs of the input data $x_{1...S}$ is inputted to the encoder-side embedding layer e1. The encoder-side embedding layer e1 performs matrix transformation on the input symbol $x_s$ using a matrix for the embedding process, thereby obtaining embedding data $Xv_s$. The obtained embedding data $Xv_s$ is transmitted to the encoder-side LSTM layer e2.

In the encoder-side LSTM layer e2, an encoding process (for example, an encoding process with LSTM) is performed on the embedding data $Xv_s$ and the input-side hidden state data $hi_{s-1}$, thereby obtaining the input-side hidden state data $hi_s$ at time s.

The input-side hidden state data $hi_s$ obtained in the encoder-side LSTM layer e2 is transmitted to the holding unit e3 and the attention unit ATN1.

The holding unit e3 receives and stores the input-side hidden state data $hi_s$ at time s transmitted from the encoder side LSTM layer e2, and also transmits the input side hidden state data $hi_s$ at time s−1 immediately before the current time to the encoder-side LSTM layer e2.

The encoder 1131 repeats the above process from time 1 to S, and when time S is reached, the input-side hidden state data $hi_S$ transmitted from the encoder-side LSTM layer e2 is transmitted to the decoder 1132.

The holding unit a1 of the attention unit ATN1 records the input-side hidden state data $hi_s$ transmitted from the encoder at all times s from 1 to S. The input-side hidden state data at all times from 1 to S are collectively referred to as Hi.

The context calculation unit a2 obtains the context state data $c_t$ at time t from the input-side hidden state data Hi at all times and the output-side hidden state data $ho_{t-1}$. The context calculation unit a2 then transmits the obtained context state data $c_t$ to the decoder-side LSTM layer d1.

The context calculation unit a2 calculates an input symbol alignment score $e_{st}$ at a certain time s from the input-side hidden state data $hi_s$ and the output-side hidden state data $ho_{t-1}$ at the certain time s. For this calculation, a method such as calculating a weighted sum of the input-side hidden state data $hi_s$ and the output-side hidden state data $ho_t$ is used, but other calculation methods may be used.

The context calculation unit a2 calculates the input symbol alignment score $e_{st}$ for all times from 1 to S, and obtains an input symbol weight $\alpha_{st}$ while normalizing the input symbol weight $\alpha_{st}$ such that a sum of all the input symbol weights $\alpha_{st}$ is 1. The context calculation unit a2 then weights and mixes the input-side hidden state data Hi with the input symbol weight $\alpha_{st}$ for all times s to obtain context state data ct.

The context state data $c_t$ obtained by the above process is transmitted to the decoder-side LSTM layer d1.

The decoder 1132 first records the input-side hidden state data $hi_S$ transmitted from the encoder 1131 in the holding unit d2 as an initial value $ho_0$ of the output-side hidden state data. Also, the beginning-of-sentence symbol (BOS) is stored in the holding unit d4 as an initial value $y_0$ of the output symbol.

The decoder-side embedding layer d0 obtains the output symbol $y_{t-1}$ at the time t−1 from the holding unit d2 for time t−1, which is a time immediately before a certain time t, and performs matrix transformation using a matrix for performing the embedding process, thereby obtaining embedding data $Yv_{t-1}$. The decoder-side embedding layer d0 then transmits the obtained embedding data $Yv_{t-1}$ to the decoder-side LSTM layer d1.

In the decoder-side LSTM layer d1, a decoding process (for example, a decoding process with LSTM) is performed on the context state data $c_t$, the output-side hidden state data $ho_{t-1}$, and the embedding data $Yv_{t-1}$, thereby obtaining the output-hidden state data $ho_t$ at time t. The obtained output-side hidden state data $ho_t$ is then transmitted to the sampling unit d3, the holding unit d2, and the attention unit ATN1.

The holding unit d2 receives and stores the output-side hidden state data $ho_t$ at time t transmitted from the decoder side LSTM layer d1, and also transmits the output-side hidden state data $ho_{t-1}$ at time t−1 to the decoder-side LSTM layer d1.

The sampling unit d3 calculates the word output distribution $Yo_t$ from the output-side hidden state data $ho_t$, and an output symbol $y_t$ at time t is obtained from the word output distribution $Yo_t$ by using a random sampling process.

The word output distribution $Yo_t$ is data indicating all output symbol candidates in a posterior probability distribution, and is calculated by linearly converting and normalizing the output-side hidden state data $ho_t$. In the conventional neural machine translation process, data having the maximum posterior probability for an output symbol is selected from the word output distribution $Yo_t$, and an output symbol $y_t$ corresponding to the selected data is outputted. Instead of performing such a process, the sampling unit d3 randomly selects data from all output symbol candidates with a probability according to the word output distribution $Yo_t$, and outputs data corresponding to the selected data as an output symbol $y_t$. As a result, the data output from the sampling unit d3 is not limited to data with the maximum posterior probability for the output symbol, and data with a low posterior probability for the output symbol (low likelihood) is also outputted.

The decoder 1132 repeats the above process from time 1 to T, and obtains output data $y_{1...T}$.

The output data $y_{1...T}$ obtained as described above is transmitted from the first machine translation processing unit 113 to the data output processing unit 114.

Note that the first machine translation processing unit 113 performs the machine translation process multiple times based on the control signal Ctl1 transmitted from the control unit 112 until N pieces of source language data are obtained for one target language data D1_j.

The data output processing unit 114 continues to obtain the output data $y_{1...T}$ transmitted from the first machine translation processing unit 113 until the machine translation result data corresponding to the data D1_j is obtained. After the machine translation result data corresponding to the data D1_j is obtained, the data output processing unit 114 obtains data D1_e, which is machine translation result data corresponding to the data D1_j, from the obtained data $y_{1...T}$.

The data output processing unit 114 obtains N pieces of machine translation result data D1_e based on the control signal Ctl1, and then transmits the collected data of the N pieces of machine translation result data D1_e as pseudo source language group data D1_e_N to the pseudo parallel translation data obtaining unit 12.

The pseudo parallel translation data obtaining unit 12 generates data in which the target language data D1_j and the N pieces of pseudo source language data D1_e included in the pseudo source language group data D1_e_N are paired, and then transmits the generated N sets of data as parallel translation data Dp1_ej_N to the pseudo parallel corpus storage unit DB_p.

FIG. 12 is a diagram illustrating an example of the pseudo source language data D1_e_N obtained by the back-translation unit 11. Specifically, the upper part of FIG. 12 shows the target language data D1_j; the middle part of FIG. 12 shows the pseudo source language data D1_e_N (in a case of N=5); and the lower part of FIG. 12 shows a manually back-translated sentence as a reference.

In the conventional neural machine translation process, data having the maximum posterior probability for the output symbol is selected from the word output distribution; thus, in the case shown in FIG. 12, only the pseudo source language data shown as data D1_e[1], whose log likelihood is maximum, is obtained.

Conversely, in the back-translation unit 11 of the pseudo parallel translation data generation unit 1, the sampling unit d3 randomly selects data with a probability according to the word output distribution $Yo_t$ calculated from the output-hidden state data $ho_t$, and then the selected data is outputted as an output symbol $y_t$. Thus, the back-translation unit 11 of the pseudo parallel data generation unit 1 can obtain various source language data in which log likelihoods are dispersed as shown in FIG. 12. In particular, in the prior art, pseudo source language data having a low log likelihood is not obtained, and generally, the output of machine translation has a similar tendency, thus making it difficult to produce diversity. Performing the process as described above in the back-translation unit 11 allows for obtaining various translated sentences that have been difficult to output by conventional machine translation.

For example, in a case of the data in FIG. 12, the pseudo parallel translation data obtaining unit 12 generates data in which the target language data D1_j shown in the upper part of FIG. 12 and the N (=5) pieces of pseudo source language data D1_e (referred to as D1_e[1], D1_e[2], ..., D1_e[5]) shown in the middle part of FIG. 12 are paired. In other words, the pseudo parallel translation data obtaining unit 12 generates N (=5) sets of data as follows:

(1) [D1_j, D1_e[1]]
(2) [D1_j, D1_e[2]]
(3) [D1_j, D1_e[3]]
(4) [D1_j, D1_e[4]]
(5) [D1_j, D1_e[5]]

The above-described N sets of data are transmitted as pseudo parallel translation data Dp1_ej_N (={[D1_j, D1_e[1]], [D1_j, D1_e[2]], [D1_j, D1_e[3]], [D1_j, D1_e[4]], [D1_j, D1_e[5]]}) to the pseudo parallel corpus storage unit DB_p.

The pseudo parallel corpus storage unit DB_p stores the pseudo parallel translation data Dp1_ej_N obtained by the pseudo parallel translation data generation unit 1.

As described above, the machine translation system 1000 performs the pseudo parallel translation data generation process.

(1.2.2: Machine Translation Training Process)

Next, a machine translation training process in the machine translation system 1000 will be described.

The composite parallel translation data obtaining unit 2 reads the pseudo parallel translation data Dp2_ej from the pseudo parallel corpus storage unit DB_p and also reads the base parallel translation data Db2_ej from the base parallel corpus DB_b. The composite parallel translation data obtaining unit 2 performs a parallel translation data composite process on the pseudo parallel translation data Dp2_ej and the base parallel translation data Db2_ej, thereby obtaining composite parallel translation data D2_ej.

Specifically, the composite parallel translation data obtaining unit 2 generates the pseudo parallel translation data Dp2_ej and the base parallel translation data Db2_ej as mini-batch set data, and sets a learning rate for each generated mini-batch set. For example, data in a case when the learning rate $\eta$ (=$\eta 0$) is associated with the mini-batch set data that the composite parallel translation data obtaining unit 2 has generated by collecting the base parallel translation data Db2_ej is referred to as Data1(Db2_ej, $\eta 0$), Data2(Db2_ej, $\eta 0$), Data3(Db2_ej, $\eta 0$), ..., Datak(Db2_ej, $\eta 0$).

Further, data in a case when the learning rate $\eta 1$ (for example, $\eta 1 = \eta/N$) is associated with the mini-batch set data that the composite parallel translation data obtaining unit 2 has generated by collecting the pseudo parallel translation data Dp2_ej is referred to as Data1(Dp2_ej, $\eta 1$), Data2(Dp2_ej, $\eta 1$), Data3(Dp2_ej, $\eta 1$), ..., Datak(Db2_ej, $\eta 1$).

The composite parallel translation data obtaining unit 2 mixes the mini-batch set data generated by collecting the base parallel translation data Db2_*ej* generated as described above and the mini-batch set data generated by collecting the pseudo parallel translation data Dp2_*ej*, and changes the order, thereby generating composite parallel translation data D2_*ej* as the following data, for example.

D2_*ej*={Data1(Db2_*ej*, η0), Data2(Db2_*ej*, η0), Data3(Db2_*ej*, η0), Data4(Dp2_*ej*, η1), Data5(Dp2_*ej*, η1), ... , Datak(Dp2_*ej*, η1), ... }

η1=η0/N

The number of pieces of the mini-batch set data generated by collecting the pseudo parallel translation data Dp2_*ej* is usually much greater than the number of pieces of the mini batch set data generated by collecting the base parallel translation data Db2_*ej*. Conversely, for the accuracy of the parallel translation data, the accuracy of the base parallel translation data Db2_*ej* is higher than that of the pseudo parallel translation data Dp2_*ej*. Thus, in constructing the learning model of the translation unit 3, if the learning process is performed with the pseudo bilingual data Dp2_*ej* and the base bilingual data Db2_*ej* having the same learning rate, a highly accurate learning process (training process) cannot be performed.

Thus, as described above, the composite parallel translation data obtaining unit 2 sets the learning rate η1 for the mini-batch set data generated by collecting the pseudo parallel translation data Dp2_*ej* to a value smaller than the learning rate θ0 for the mini-batch set data generated by collecting the base parallel translation data Db2_*ej* to obtain the composite parallel translation data D2_*ej*. Using the composite parallel translation data D2_*ej* obtained in this way allows for performing a highly accurate learning process (training process) in the translation unit 3.

The composite parallel translation data D2_*ej* obtained as described above is transmitted from the composite parallel translation data obtaining unit 2 to the translation unit 3.

The learning rate adjustment unit 30 of the translation unit 3 receives the composite parallel translation data D2_*ej* associated with the learning rate η transmitted from the composite parallel translation data obtaining unit 2. When transmitting parallel translation data obtained from the base parallel corpus DB_b to the encoder 321 and decoder 322, the learning rate adjustment unit 30 sets the output learning rate η_out to its corresponding learning rate η (for example, η0) and transmits it. Conversely, when transmitting parallel translation data obtained from the pseudo parallel corpus storage unit DB_p to the encoder 321 and the decoder 322, the learning rate adjustment unit 30 sets the output learning rate η_out to its corresponding learning rate η (for example, η0/N) and transmits it. Note that the learning rate adjustment unit 30 also outputs the output learning rate η_out to the attention unit ATN1A.

For example, when processing the mini-batch set data Data1(Db2_*ej*, η0) included in the composite parallel translation data D2_*ej*, the learning rate adjustment unit 30 sets the learning rate to η0 and causes the base parallel translation data included in the data Data1(Db2_*ej*, η0) to be inputted into the encoder 321 and the decoder 322, and then performs the learning process (training process) for constructing a learning model for the second machine translation processing unit 32. In this case, the highly accurate base parallel translation data is used, and thus the learning process (training process) is performed at a high learning rate.

Conversely, when processing the mini-batch set data Data4(Dp2_*ej*, η1) included in the composite parallel translation data D2_*ej*, the learning rate adjustment unit 30 sets the learning rate to η1 (for example, η1=η0/N), and causes the pseudo parallel translation data included in the data Data4(Dp2_*ej*, η1) to be inputted to the encoder 321 and the decoder 322, and then performs the learning process (training process) for constructing a learning model for the second machine translation processing unit 32. In this case, pseudo-parallel translation data with lower accuracy than the base parallel translation data is used, and thus the learning process (training process) is performed at a lower learning rate than when the base parallel translation data is used.

As described above, the translation unit 3 performs the learning process (training process) for constructing a learning model.

(1.2.3: Machine Translation Execution Process)

Next, a machine translation execution process in the machine translation system 1000 will be described.

The source language data Din_e is inputted to the input data conversion unit 31 of the translation unit 3.

The input data conversion unit 31 converts the source language data Din_e into data $x_{1 \ldots s}$ having a data format that can be machine-translated by the second machine translation processing unit 32, and then transmits the converted data $x_{1 \ldots s}$ to the second machine translation processing unit 32.

The second machine translation processing unit 32 performs the machine translation process using the learning model constructed by the translation unit 3 through the above-described machine translation training process, thereby obtaining output data $y_{1 \ldots T}$.

The output data conversion unit 33 receives the output data $y_{1 \ldots T}$ transmitted from the second machine translation processing unit 32, and after machine translation resultant data corresponding to the source language data Din_e is obtained, the output data conversion unit 33 obtains target language data Dout_j from the obtained data $y_{1 \ldots T}$ and outputs it.

As described above, the machine translation execution process in the machine translation system 1000 is performed.

As described above, the machine translation system 1000 obtains multiple pieces of pseudo source language data from one piece of target language data by using a single language corpus of the target language, thus allowing for obtaining a large amount of pseudo parallel corpus data having diversity. Further, the machine translation system 1000 uses both the pseudo parallel corpus data having diversity, which has been obtained in large quantities, and the base parallel corpus data in a small quantity but with high accuracy, with the applied learning rates changed accordingly, to perform the learning process (training process) for the machine translation model. This allows the machine translation system 1000 to obtain a learned model (machine translation model) with very high accuracy.

For example, the base parallel corpus data is data containing 400,000 sentences, the pseudo parallel corpus data is data containing 1.550 million sentences, and the translation processing unit 3 learns (trains) and obtains the machine translation model by the above-described process. As a result of measuring the translation accuracy with the learned model obtained by the above process, the accuracy of translation by the above process is improved by about 3.0 to 5.0 in terms of BLEU score compared with the machine translation by the machine translation model (learned model) obtained using only the base parallel corpus data.

The BLEU score is improved by about 0.5 to 2.0 compared with a case where the technique of Non-Patent Document 1 is used.

Note that in the machine translation system 1000, when it is determined that the accuracy of the pseudo parallel translation data Dp1_ej_N is poor, that is, it has an adverse effect on the learning process (training process) of the translation unit 3, filtering with the pseudo parallel translation data Dp1_ej_N may be performed. For example, data to be selected may be determined based on the following criteria.

(1) Likelihood

The pseudo source language data D1_e to be included in the pseudo parallel data Dp1_ej_N is selected with reference to the likelihood (including the likelihood corrected by the length of the translated sentence) obtained by the back-translation unit 11.

(2) Confidence

For example, the pseudo source language data D1_e to be included in the pseudo parallel data Dp1_ej_N is selected based on the confidence of a translated sentence obtained by the technique disclosed in the following document (Atsushi Fujita, etc.).

Atsushi Fujita and Eiichiro Sumita 2017. Japanese to English/Chinese/Korean datasets for translation quality estimation and automatic post-editing. In Proc of WAT2017, pages 79-88.

(3) Random Selection

The pseudo source language data D1_e included in the pseudo parallel translation data Dp1_ej_N is selected by random selection.

Other Embodiments

A case where the machine translation system 1000 of the above embodiment sets the learning rate for the parallel translation data obtained from the base parallel corpus DB_b (for example, $\eta=\eta 0$) to a fixed value and sets the learning rate for the parallel translation data obtained from the pseudo parallel corpus storage unit DB_p (for example, $\eta=\eta 0/N$) to a fixed value has been described. However, the present invention should not be limited to this; for example, the learning rate may be variable for each batch set data. Further, the learning rate (for example, $\eta=\eta 0$) for the parallel translation data obtained from the base parallel corpus DB_b and the learning rate (for example, $\eta=\eta 0/N$) for the parallel translation data obtained from the pseudo parallel corpus storage unit DB_p should not be limited to the above-described values and may be other values. For example, the learning rate for the parallel translation data obtained from the pseudo parallel corpus storage unit DB_p may be $\eta=\eta 0/M$ (M is a real number).

Although the above embodiment describes a case in which N (N is a natural number equal to or greater than two) pieces of pseudo source language data is obtained for one piece of target language data by performing the process in the first machine translation processing unit N times, the present invention should not be limited to this. For example, the first machine translation processing unit may perform one machine translation process, and may perform random selection N times in which output data is selected from a plurality of candidates in the word output distribution for the input data, thereby obtaining N pieces of pseudo source language data.

All or part of the functional units of the machine translation system 1000 according to the above embodiment may be achieved with a single device or may be achieved with a plurality of devices.

Each block of the machine translation system 1000 described in the above embodiment may be formed using a single chip with a semiconductor device, such as LSI, or some or all of the blocks of the machine translation system 1000 may be formed using a single chip.

Note that the LSI described here may also be referred to as an IC, a system LSI, a super LSI, or an ultra LSI, depending on the degree of integration.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiment may be implemented using programs. All or part of the processes performed by the functional blocks described in the above embodiment is implemented by a central processing unit (CPU) included in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware.

For example, when functional units of the above embodiment is achieved by using software, the hardware structure (the hardware structure including CPU, ROM, RAM, an input unit, an output unit, a communication unit, a storage unit (e.g., a storage unit achieved by using HDD, SSD, or the like), a drive for external media or the like, each of which is connected to a bus) shown in FIG. 9 may be employed to achieve the functional units by using software.

When each functional unit of the above embodiment is achieved by using software, the software may be achieved by using a single computer having the hardware configuration shown in FIG. 9, and may be achieved by using distributed processes using a plurality of computers.

Figure 14:
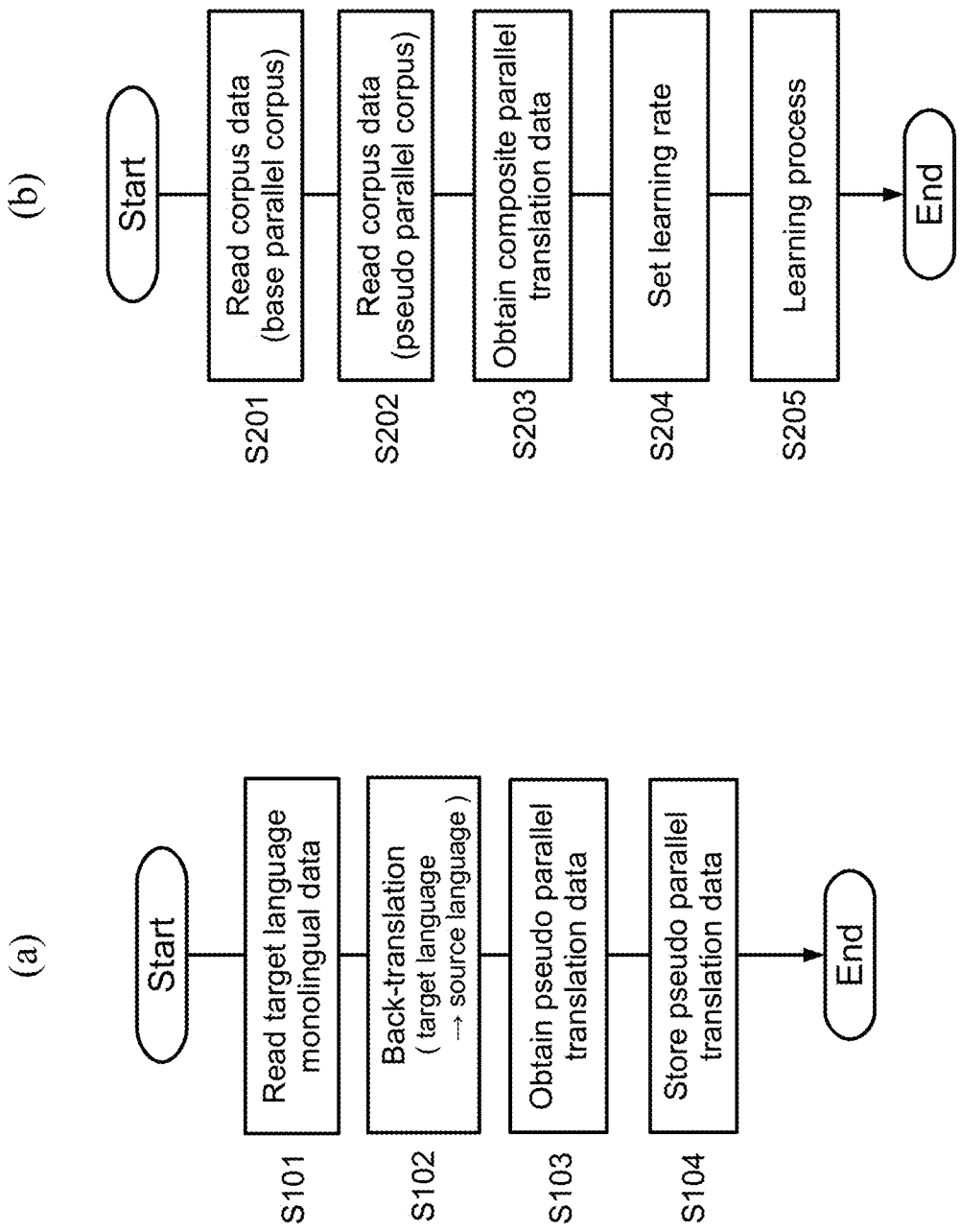
FIG. 14 is a flowchart of a pseudo parallel translation data generation method and a learning process (training process) method for constructing a machine translation learning model.

For example, when the pseudo parallel translation data generation method is achieved by using software, the pseudo parallel translation data generation method may be achieved by processes of the flowchart shown in FIG. 14(*a*).

Specifically, with the pseudo parallel translation data generation method, step S101 reads the target language monolingual data from the target language monolingual corpus.

In step S102, a back-translation process is performed for one piece of target language data read in step S101, thereby obtaining N pieces of source language data.

In step S103, pseudo parallel translation data obtained by pairing one piece of target language data and N pieces of source language data obtained by back-translating the target language is obtained.

In step S104, the pseudo parallel translation data obtained in step S103 is stored in a database, for example, thereby obtaining a pseudo parallel corpus.

For example, when a learning process (training process) method for constructing a machine translation learning model is achieved by using software, the method may be achieved by processes of a flowchart shown in FIG. 14(b).

Specifically, with a learning process (training process) method for constructing a machine translation learning model, base parallel translation data is read from the base parallel corpus in step S201.

In step S202, pseudo parallel translation data is read from the pseudo parallel corpus.

In step S203, a mini-batch set of base parallel translation data obtained in step S201 is generated, a mini-batch set of pseudo parallel translation data obtained in step S202 is generated, and composite parallel translation data is obtained by mixing both mini-batch sets and swapping their orders.

In step S204, the learning rate for each mini-batch set included in the composite parallel translation data is set.

In step S205, a learning process is performed using each mini-batch set included in the composite parallel translation data. Note that at this time, the learning rate that has been set for the mini-batch set to be processed is used.

Processing as described above allows the pseudo parallel translation data generation method and the learning process (training process) method for constructing the machine translation learning model to be achieved by using software.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded.

Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program should not be limited to one recorded on the recording medium, but may be transmitted via an electric communication line, a wireless or wired communication line, a network represented by the Internet, or the like.

The specific structures described in the above embodiment are mere examples of the present invention, and may be changed and modified variously without departing from the scope and the spirit of the invention.

INDUSTRIAL APPLICABILITY

The present invention achieves a model training method for neural machine translation that enhances an encoder (including attention) using a monolingual corpus of a target language and improves the accuracy of the entire translator, and a machine translation system for performing the model training method. For this reason, this invention is useful in the natural language process related industrial fields, and can be implemented in such fields.

REFERENCE SIGNS LIST 1000 machine translation system
1 pseudo parallel translation data generation unit (pseudo translation data generation apparatus)
11 back-translation unit
113 first machine translation processing unit
1131 encoder
1132 decoder
12 pseudo parallel translation data obtaining unit
2 composite parallel translation data obtaining unit
3 translation unit
DB_p pseudo parallel corpus storage unit
DB_b base parallel corpus storage unit
DB_m target language monolingual corpus storage unit

What is claimed is:

1. A pseudo parallel translation data generation apparatus comprising:
   a back-translation unit that performs a machine back-translation process on one piece of target language data obtained from a target language monolingual corpus to obtain N pieces of pseudo source language data, N being a natural number equal to or greater than two, the back-translation unit including:
      an encoder that obtains input-side hidden state data from input data; and
      a decoder that obtains output-side hidden state data from the input-side hidden state data obtained by the encoder, randomly selects data from an output word distribution represented by the obtained output-side hidden state data, and outputs word data corresponding to the selected data as output data; and
   a pseudo parallel translation data obtaining unit that pairs the one piece of target language data and each of the N pieces of pseudo source language data obtained by the back-translation unit to obtain N sets of pseudo parallel translation data.

2. The pseudo parallel translation data generation apparatus according to claim 1, further comprising a pseudo parallel corpus storage unit that stores the pseudo parallel translation data,
   wherein the pseudo parallel translation data obtaining unit performs a filtering process on the N sets of pseudo parallel translation data based on at least one of the likelihood and confidence of the pseudo source language data obtained by the back-translation unit, and stores the pseudo parallel translation data after the filtering process in the pseudo parallel corpus storage unit.

3. A machine translation processing apparatus comprising:
   a composite parallel translation data obtaining unit that:
   corresponds base parallel translation data obtained from a base parallel corpus to a first learning rate corresponding to the base parallel translation data to generate first batch set data,
   corresponds pseudo parallel translation data generated by the pseudo parallel translation data generation apparatus according to claim 2 to a second learning rate corresponding to the pseudo parallel translation data to generate second batch set data, and
   obtains composite parallel translation data including the first batch set data and the second batch set data;
   a translation unit that obtains a learned model for a machine translation process by learning using the composite parallel translation data, performs the machine translation process for machine-translating source language data into target language data using the learned model, in a learning process using the first batch set data, performs the learning process at the first learning rate, and in a learning process using the second batch set data, performs the learning process at the second learning rate.

4. The machine translation processing apparatus according to claim 3, wherein the first learning rate is greater than the second learning rate.

5. A machine translation processing apparatus comprising:
   a composite parallel translation data obtaining unit that:
   corresponds base parallel translation data obtained from a base parallel corpus to a first learning rate corresponding to the base parallel translation data to generate first batch set data,
   corresponds pseudo parallel translation data generated by the pseudo parallel translation data generation apparatus according to claim 1 to a second learning rate corresponding to the pseudo parallel translation data to generate second batch set data, and
   obtains composite parallel translation data including the first batch set data and the second batch set data;
   a translation unit that obtains a learned model for a machine translation process by learning using the composite parallel translation data, performs the machine translation process for machine-translating source language data into target language data using the learned model, in a learning process using the first batch set data, performs the learning process at the first learning rate, and in a learning process using the second batch set data, performs the learning process at the second learning rate.

6. The machine translation processing apparatus according to claim 5, wherein the first learning rate is greater than the second learning rate.

7. A pseudo parallel translation data generation method used with a pseudo parallel translation data generation apparatus including a processor, an encoder, and a decoder, the pseudo parallel translation data generation method comprising:
   a back-translation step of performing a machine back-translation process on one piece of target language data obtained from a target language monolingual corpus to obtain N pieces of pseudo source language data, N being a natural number equal to or greater than two, the back-translation step including:
   using the encoder, obtaining input-side hidden state data from input data; and
   using the decoder, obtaining output-side hidden state data from the input-side hidden state data obtained by the encoder, randomly selecting data from an output word distribution represented by the obtained output-side hidden state data, and outputting word data corresponding to the selected data as output data; and
   using the processor, a pseudo parallel translation data obtaining step of pairing the one piece of target language data and each of the N pieces of pseudo source language data obtained by the back-translation step to obtain N sets of pseudo parallel translation data.

\* \* \* \* \*